United States Patent
Hansen et al.

(10) Patent No.: US 11,185,392 B2
(45) Date of Patent: Nov. 30, 2021

(54) ONE-PIECE DENTAL RESTORATION MOLDS

(71) Applicant: 3M INNOVATIVE PROPERTIES COMPANY, St. Paul, MN (US)

(72) Inventors: James D. Hansen, White Bear Lake, MN (US); Joseph C. Dingeldein, Blaine, MN (US); Mary C. Doruff, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 289 days.

(21) Appl. No.: 16/061,362

(22) PCT Filed: Dec. 15, 2016

(86) PCT No.: PCT/US2016/066777
§ 371 (c)(1),
(2) Date: Jun. 12, 2018

(87) PCT Pub. No.: WO2017/106419
PCT Pub. Date: Jun. 22, 2017

(65) Prior Publication Data
US 2018/0280116 A1    Oct. 4, 2018

Related U.S. Application Data

(60) Provisional application No. 62/268,551, filed on Dec. 17, 2015.

(51) Int. Cl.
*A61C 5/85*    (2017.01)
*B33Y 80/00*    (2015.01)
(Continued)

(52) U.S. Cl.
CPC .................. *A61C 5/85* (2017.02); *A61C 5/62* (2017.02); *A61C 5/77* (2017.02); *A61C 9/0033* (2013.01);
(Continued)

(58) Field of Classification Search
CPC .... A61C 5/85; A61C 5/77; A61C 5/62; A61C 9/0033; A61C 13/0004; A61C 13/0006;
(Continued)

(56) References Cited

U.S. PATENT DOCUMENTS

| | | |
|---|---|---|
| 613,947 A | 11/1898 | Strout |
| 2,090,904 A | 7/1933 | Singer |

(Continued)

FOREIGN PATENT DOCUMENTS

| | | |
|---|---|---|
| CN | 204709027 | 10/2015 |
| DE | 10 2009 039 880 | 3/2011 |

(Continued)

OTHER PUBLICATIONS

"Bite-perf: the art of occlusal duplication", [retrieved form the internet on Aug. 8, 2017], URL <www.biteperf.es>, 2pgs.
(Continued)

*Primary Examiner* — Heidi M Eide
*Assistant Examiner* — Drew S Folgmann

(57) ABSTRACT

A custom tool for forming a dental restoration in a mouth of a patient includes a one-piece mold body providing for a customized fit with at least one tooth of the patient, the one-piece mold body including an occlusal portion forming an occlusal surface corresponding with an occlusal surface of the tooth, a mesial proximal portion forming a mesial proximal surface corresponding with a mesial proximal surface of the tooth, and a distal proximal portion forming a distal proximal surface corresponding with a distal proximal surface of the tooth. The mold body is configured to
(Continued)

combine with the tooth of the patient to form a mold cavity encompassing missing tooth structure of the tooth. The occlusal portion, the mesial proximal portion, and the distal proximal portion are based on three-dimensional scan data of the mouth of the patient.

34 Claims, 9 Drawing Sheets

(51) Int. Cl.
 *A61C 5/77* (2017.01)
 *A61C 5/62* (2017.01)
 *A61C 13/00* (2006.01)
 *A61C 9/00* (2006.01)
(52) U.S. Cl.
 CPC .......... *A61C 13/0004* (2013.01); *B33Y 80/00* (2014.12); *A61C 13/0006* (2013.01); *A61C 13/0022* (2013.01)
(58) Field of Classification Search
 CPC ... A61C 13/0022; A61C 13/081; A61C 13/20; A61C 13/206; B33Y 80/00
 See application file for complete search history.

(56) References Cited

U.S. PATENT DOCUMENTS

| | | |
|---|---|---|
| 2,674,801 A | 4/1954 | Trangmar |
| 3,224,050 A | 12/1965 | Redtenbacher |
| 3,482,314 A | 12/1969 | Tofflemire |
| 4,368,040 A | 1/1983 | Weissman |
| 4,433,959 A | 2/1984 | Faunce |
| 4,695,254 A | 9/1987 | Herrell |
| 4,704,087 A | 11/1987 | Dragan |
| 4,713,005 A | 12/1987 | Marshall |
| 4,775,320 A | 10/1988 | Marshall |
| 4,775,430 A | 10/1988 | Tanaka |
| 4,778,386 A | 10/1988 | Spiry |
| 4,881,898 A | 11/1989 | Harvey, Sr. |
| 5,192,207 A | 3/1993 | Rosellini |
| 5,195,889 A | 3/1993 | Von Weissenfluh |
| 5,332,390 A | 7/1994 | Rosellini |
| 5,382,160 A | 1/1995 | Shemet |
| 5,487,663 A | 1/1996 | Wilson |
| 5,803,734 A | 9/1998 | Knutson |
| 5,890,896 A | 4/1999 | Padial |
| 6,482,314 B1 | 11/2002 | Khare |
| 6,659,772 B2 | 12/2003 | Margeas |
| 6,776,614 B2 | 8/2004 | Weichmann |
| 6,821,462 B2 | 11/2004 | Schulman |
| 6,845,175 B2 | 1/2005 | Kopelman |
| 7,027,642 B2 | 4/2006 | Rubbert |
| 7,056,115 B2 | 6/2006 | Phan |
| 7,092,780 B2 | 8/2006 | Ganley |
| 7,162,321 B2 | 1/2007 | Luihardi |
| 7,217,131 B2 | 5/2007 | Vuillemot |
| 7,234,937 B2 | 6/2007 | Sachdeva |
| 7,236,842 B2 | 6/2007 | Kopelman |
| 7,442,040 B2 | 10/2008 | Kuo |
| 7,605,817 B2 | 10/2009 | Zhang |
| 7,689,310 B2 | 3/2010 | Kopelman |
| 7,731,495 B2 | 6/2010 | Eisenberg |
| 7,801,632 B2 | 9/2010 | Orth |
| 7,956,862 B2 | 6/2011 | Zhang |
| 8,194,067 B2 | 6/2012 | Raby |
| 8,255,071 B2 | 8/2012 | Kaigler, Sr. |
| 8,308,478 B2 | 11/2012 | Primus |
| 8,359,114 B2 | 1/2013 | Steingart |
| 8,366,445 B2 | 2/2013 | Vuillemot |
| 8,393,897 B2 | 3/2013 | Clark |
| 8,491,306 B2 | 7/2013 | Raby |
| 8,527,079 B2 | 9/2013 | Kim |
| 8,696,356 B2 | 4/2014 | Hegyi |
| 8,753,114 B2 | 6/2014 | Vuillemot |
| 8,794,965 B2 * | 8/2014 | Latiolais .................. A61C 9/00 433/173 |
| 8,882,497 B2 | 11/2014 | Frantz |
| 8,909,363 B2 | 12/2014 | Kopelman |
| 9,308,058 B2 | 4/2016 | Clark |
| 9,375,290 B2 | 6/2016 | Csapo |
| 9,414,895 B2 | 8/2016 | Clark |
| 10,327,873 B2 | 6/2019 | Fisker |
| 2004/0029068 A1 | 2/2004 | Sachdeva |
| 2005/0042577 A1 | 2/2005 | Kvitrud |
| 2005/0089813 A1 | 4/2005 | Slone |
| 2005/0089814 A1 | 4/2005 | Slone |
| 2006/0008777 A1 | 1/2006 | Peterson |
| 2006/0115792 A1* | 6/2006 | Vuillemot .............. A61K 6/887 433/215 |
| 2006/0122719 A1 | 6/2006 | Kopelman |
| 2008/0153069 A1 | 6/2008 | Holzner |
| 2008/0227056 A1 | 9/2008 | Bulard |
| 2009/0026643 A1 | 1/2009 | Wiest |
| 2009/0104581 A1 | 4/2009 | Simon |
| 2010/0159412 A1 | 6/2010 | Moss |
| 2011/0212420 A1 | 9/2011 | Vuillemot |
| 2012/0029018 A1 | 2/2012 | Lee |
| 2013/0130202 A1 | 5/2013 | Vuillemot |
| 2013/0325431 A1 | 12/2013 | See |
| 2014/0205967 A1 | 6/2014 | Csapo |
| 2015/0057782 A1 | 2/2015 | Kopelman |
| 2015/0140517 A1 | 5/2015 | Vuillemot |
| 2015/0182301 A1 | 7/2015 | Hegland |
| 2015/0250568 A1 | 9/2015 | Fisker |
| 2016/0015246 A1 | 1/2016 | Clausen |
| 2016/0089220 A1 | 3/2016 | Ebert |
| 2016/0143717 A1 | 5/2016 | Samrano |
| 2016/0262860 A1 | 9/2016 | Korten |
| 2017/0119499 A1 | 5/2017 | Clark |
| 2018/0021113 A1 | 1/2018 | Hansen |
| 2018/0280116 A1 | 10/2018 | Hansen |
| 2018/0360577 A1 | 12/2018 | Hansen |
| 2019/0083208 A1 | 3/2019 | Hansen |
| 2019/0201165 A1 | 7/2019 | Mishaeloff |
| 2019/0298489 A1 | 10/2019 | Dingeldein |

FOREIGN PATENT DOCUMENTS

| | | |
|---|---|---|
| DE | 10 2012 108 217 | 12/2013 |
| EP | 2 400 914 | 8/2018 |
| FR | 2500294 | 8/1982 |
| JP | 2008-119225 | 5/2008 |
| JP | 2014-171698 | 9/2014 |
| WO | WO 2007-084727 | 7/2007 |
| WO | WO 2009/010543 | 1/2009 |
| WO | WO 2009-042378 | 4/2009 |
| WO | WO 2009-158231 | 12/2009 |
| WO | WO 2011-041193 | 4/2011 |
| WO | WO 2011/156806 | 12/2011 |
| WO | WO 2016/066552 | 5/2013 |
| WO | WO 2016/046308 | 3/2016 |
| WO | WO 2016/066552 | 5/2016 |
| WO | WO 2016/094272 | 6/2016 |
| WO | WO 2016/095272 | 6/2016 |
| WO | WO 2017-106419 | 6/2017 |
| WO | WO 2017-106431 | 6/2017 |
| WO | WO 2018/022616 | 2/2018 |
| WO | WO 2018/022617 | 2/2018 |
| WO | WO 2020/033528 | 2/2020 |
| WO | WO 2020/033532 | 2/2020 |
| WO | WO 202005885 | 3/2020 |

OTHER PUBLICATIONS

"Bite-perf: Training kit (English)", youtube, [retrieved form the internet on Aug. 8, 2017], URL <http://www.youtube.com/watch?v=tCw45t_ntrA>, 1 pg.
3M Oral Care lecture, 2015, 16pgs_.
Conte, "A Clear PVS Matrix Technique for the Placement of Posterior Direct Composites", Dentistry Today, Apr. 30, 2008, 5pgs.

(56) References Cited

OTHER PUBLICATIONS

International Search Report for PCT International Application No. PCT/US2016/066777, dated Mar. 2, 2017, 4 pages.
"Cavity," Merriam-Webster.com Dictionary, Merriam-Webster, https://www.merriam-webster.com/dictionary/cavity. Accessed Jan. 4, 2021, 14 pages. (2021).

* cited by examiner

ONE-PIECE DENTAL RESTORATION MOLDS

TECHNICAL FIELD

This disclosure relates to dental restorations.

BACKGROUND

A dental restoration, or a dental filling, utilizes a restorative dental material used to improve function, integrity and morphology of missing or irregular tooth structure. For example, a dental restoration may be used to restore missing tooth structure due to congenital discrepancies, following external trauma, or as part of a restorative treatment for dental caries, or tooth decay.

Restorative dentistry often includes drilling decay from an infected tooth (commonly referred to as "preparing" the tooth) and then using simple tools and a high level of craftsmanship to isolate, retract, fill and contour the finished restoration. Quality isolation via a rubber dam is cumbersome and often skipped for less effective isolation via cotton roles—increasing the risk of contamination which reduces longevity of the restoration. Retraction of soft and hard tissue includes manipulation of cords, wedges and matrix bands, and imperfect technique may result in contamination, difficulty in finishing and/or polishing in interproximal areas, and poorly adapted contacts.

While 'bulk fill' restorative materials and high intensity curing lights facilitate relatively fast filling of deep cavities (e.g., 4-5 mm), many restorations are completed in a single shade as practitioners may be uncertain of the correct layering protocol for multiple shades or types of restorative material. Last, with little geometrical guidance available on a prepared tooth, creation of the final filling level and occlusal surface geometry may include overfilling with restorative dental material, followed by an iterative process of grinding and checking tooth contact and biting function on an anesthetized patient. This process may be the most time consuming for dental restorations and errors here may result in tooth sensitivity and return visits for adjustment.

Commonly-assigned PCT/US2015/064195, titled, "DENTAL RESTORATION MOLDING TECHNIQUES, filed Dec. 7, 2015, discloses dental restoration techniques incorporating the molding of dental restorative material directly on a tooth located within the mouth of a patient.

SUMMARY

This disclosure relates to dental restoration techniques incorporating the molding of restorative dental material directly on a tooth located within the mouth of a patient. Disclosed techniques include methods for dental restoration, custom tools used for dental restoration and techniques for producing custom tools for dental restoration. Disclosed techniques include tools providing mold cavities customized for an individual patient. In some examples, such custom tools may be produced using 3D printing techniques. In one example, this disclosure is directed a custom tool for forming a dental restoration in a mouth of a patient comprising a one-piece mold body providing for a customized fit with at least one tooth of the patient, the one-piece mold body including an occlusal portion forming an occlusal surface corresponding with an occlusal surface of the tooth, a mesial proximal portion forming a mesial proximal surface corresponding with a mesial proximal surface of the tooth, and a distal proximal portion forming a distal proximal surface corresponding with a distal proximal surface of the tooth. The mold body is configured to combine with the tooth of the patient to form a mold cavity encompassing missing tooth structure of the tooth. The occlusal portion, the mesial proximal portion, and the distal proximal portion are based on three-dimensional scan data of the mouth of the patient.

In another example, this disclosure is directed a custom tool for forming a dental restoration in a mouth of a patient, the custom tool comprising a one-piece mold body providing for a customized fit with at least one tooth of the patient, the one-piece mold body including an incisal portion corresponding with the incisal surface of the tooth, a mesial proximal portion forming a mesial proximal surface corresponding with a mesial proximal surface of the tooth, and a distal proximal portion forming a distal proximal surface corresponding with a distal proximal surface of the tooth. The mold body is configured to combine with the tooth of the patient to form a mold cavity encompassing missing tooth structure of the tooth. The incisal portion, the mesial proximal portion, and the distal proximal portion are based on three-dimensional scan data of the mouth of the patient.

In further example, this disclosure is directed to a process of making a custom tool for forming a dental restoration of a tooth within a mouth of a patient, the process comprising obtaining three dimensional scan data of a patient's mouth, and three-dimensionally printing a custom tool for forming the dental restoration of the tooth based on the three dimensional scan data of the mouth of the patient. The custom tool conforms to the custom tools described in the preceding paragraphs.

In further example, this disclosure is directed to a process of obtaining a custom tool for forming a dental restoration of a tooth within a mouth of a patient, the process comprising obtaining three dimensional scan data of a patient's mouth, transmitting at least a portion of the three dimensional scan data to a remote manufacturing facility, receiving, from the remote manufacturing facility, a custom tool for forming the dental restoration of the tooth based on the three dimensional scan data of the mouth of the patient. The custom tool conforms to the custom tools described in the preceding paragraphs.

In further example, this disclosure is directed to a process of obtaining a custom tool for forming a dental restoration of a tooth within a mouth of a patient, the process comprising obtaining three dimensional scan data of a patient's mouth, transmitting at least a portion of the three dimensional scan data to a remote manufacturing facility, receiving, from the remote manufacturing facility, a design for a custom tool for forming the dental restoration of the tooth based on the three dimensional scan data of the mouth of the patient. The custom tool conforms to the custom tools described in the preceding paragraphs.

The details of one or more examples of this disclosure are set forth in the accompanying drawings and the description below. Other features, objects, and advantages of this disclosure will be apparent from the description and drawings, and from the claims.

BRIEF DESCRIPTION OF DRAWINGS SHOWING SOME EXAMPLES OF THIS DISCLOSURE

DETAILED DESCRIPTION

While conventional dental restoration techniques often include iterative steps and benefit from significant practitioner skill and experience, this disclosure includes techniques that may utilize custom molds to facilitate forming dental restorations within the mouth of a patient more precisely and quickly than generally possible using conventional dental restoration techniques.

Disclosed techniques include capturing a three dimensional dentition of a patient with an intraoral scanner or scanning of a conventional impression or model. The custom tool for a dental restoration may include a mold based on the three dimensional (3D) dentition of the patient. The disclosed techniques may facilitate high quality dental restorations with reduced time and skill requirements as compared to conventional dental restoration techniques.

Figure 1:
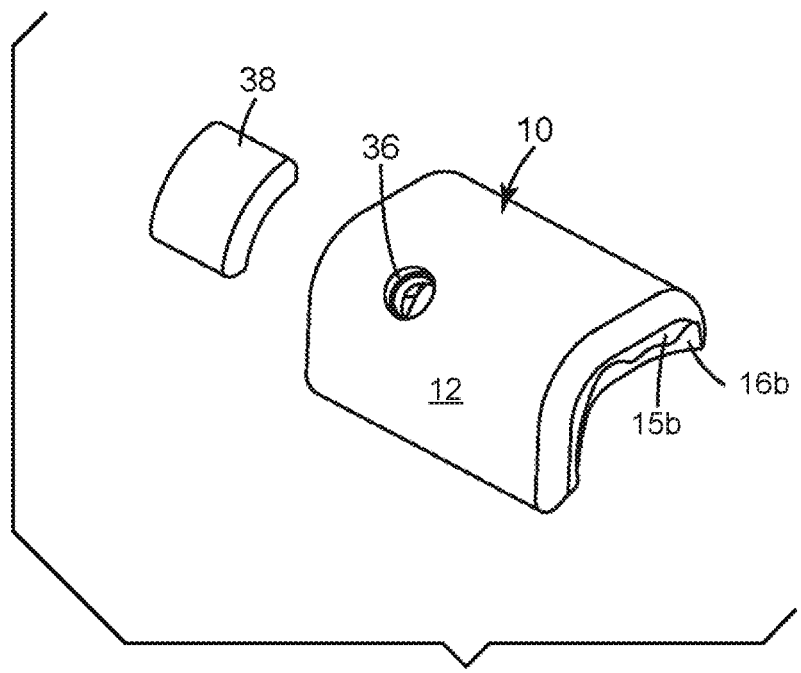
FIGS. 1-6 illustrate a custom tool for forming dental restorations of a tooth in a mouth of a patient, the custom tool including one-piece mold body providing for a customized fit with at least one tooth of the patient.
Figure 2:
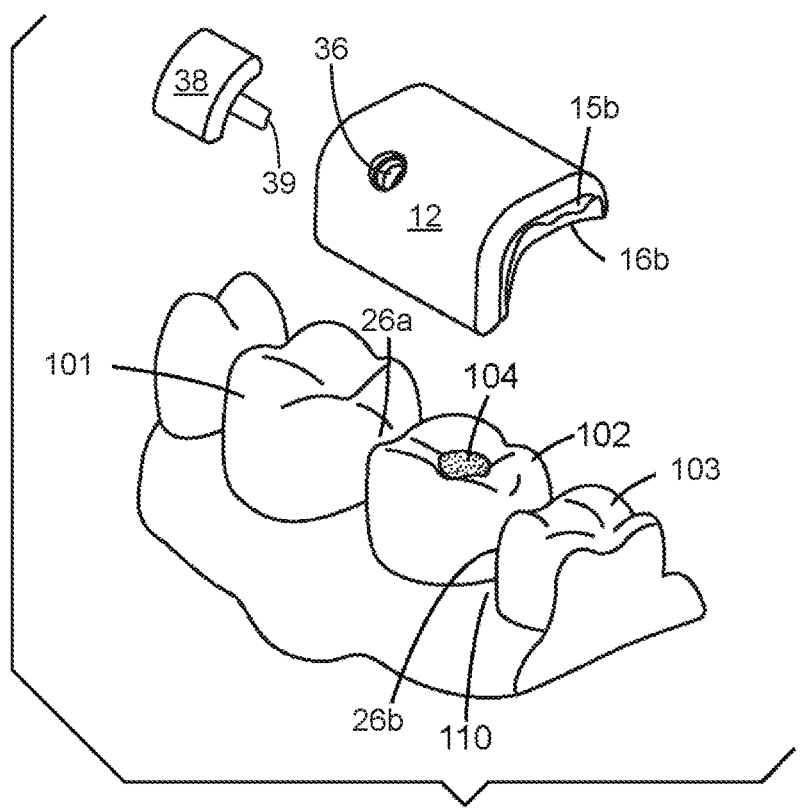
Figure 3:
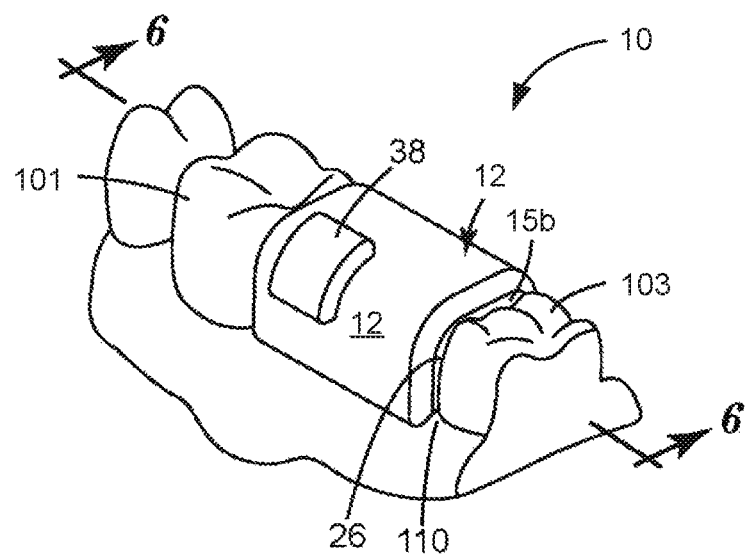
Figure 4:
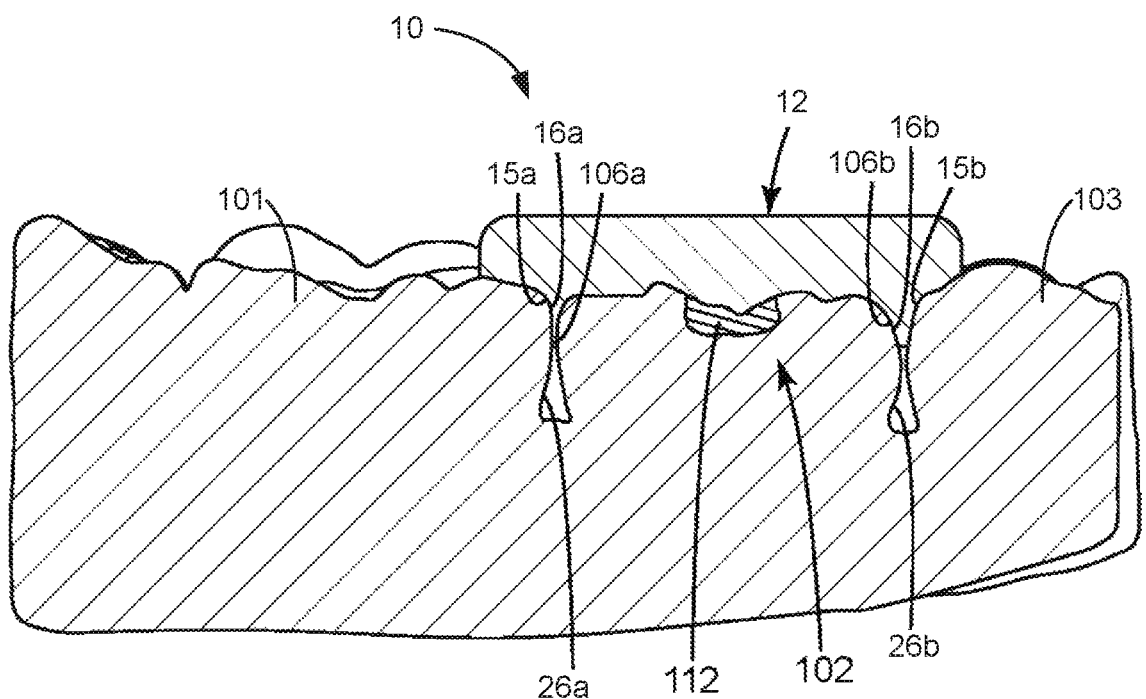
Figure 5:
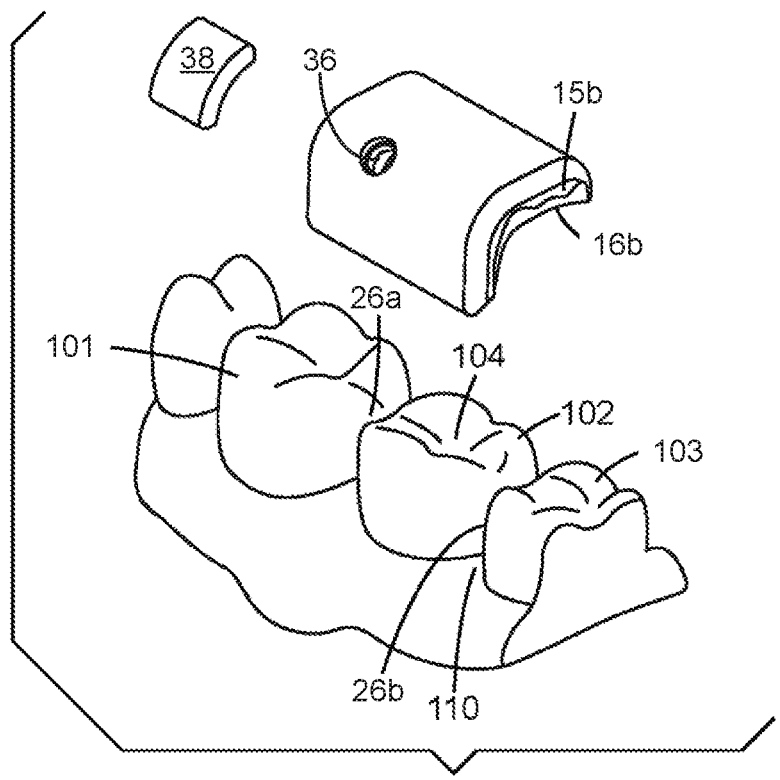
Figure 6:
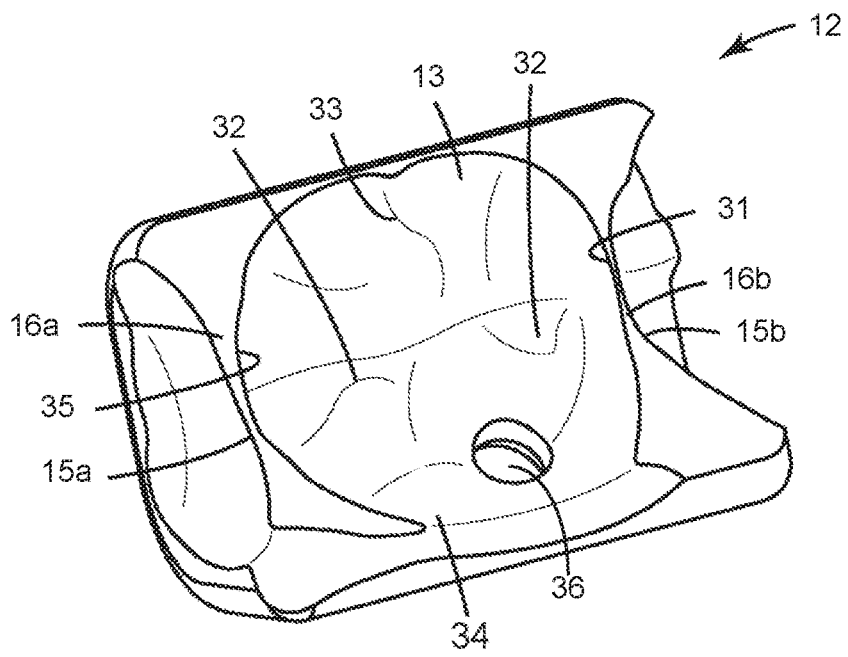

FIGS. 1-6 illustrate custom tool 10 for forming a dental restorations of tooth 102 in a mouth of a patient. In particular, FIG. 1 illustrates the components of custom tool 10, including one-piece mold body 12 and plug 38. FIG. 2 illustrates the components of custom tool 10 as well as a portion of the mouth of a patient prior to a dental restoration. FIG. 3 illustrates the components of custom tool 10 assembled within the mouth of a patient to facilitate a dental restoration, and FIG. 4 illustrates a cross-sectional view of FIG. 3. FIG. 5 illustrates the components of custom tool 10 as well as a portion of the mouth of a patient after dental restoration with custom tool 10. FIG. 6 illustrates the underside of custom tool 10, which includes surfaces that correspond to various sides of tooth 102. In some examples, custom tool 10 may represent a single tooth veneer mold and/or may be used to repair caries 104 within tooth 102.

While custom tool 10 is configured to facilitate dental restorations of a single tooth, custom tool 10 is merely one example, and the techniques described with respect to custom tool 10 can readily be applied to custom tools that facilitate repair of two teeth or more than two teeth, e.g., by including multiple mold bodies within a single mold body component.

Custom tool 10 includes a one-piece mold body 12, which provides a customized fit with tooth 102. Mold body 12 further includes optional customized surface 15a, which provides a customized fit with tooth 101 and optional customized surface 15b, which provides a customized fit with tooth 103. Customized surfaces 15a, 15b may further secure and register mold body 12 in place within a patient's mouth to facilitate precise customized dental restorations of tooth 102. Mold body 12 may further register with gingiva 110 of the patient.

Custom tool 10 further includes injection port 36 for delivery of restorative dental material to the mold cavity, which may represent a veneer for tooth 102 and or repair of missing tooth structure represented by cavity 104. Port 36 configured to accept injection of a restorative dental material for mold cavities adjacent occlusal surfaces 18. As used herein, the term "occlusal surface" may refer to the chewing surface of any teeth, including the posterior teeth, as well as incisal surfaces (e.g., incisal edges) of anterior teeth. In this manner, as used herein, the term occlusal surface is not indicative of any particular tooth or teeth.

Following the injection of restorative dental material into the mold cavities adjacent, plug 38 may be positioned such that plug tip surface 39 is positioned within port 36. Plug 38 further includes plug tip surface 39 providing defined shapes corresponding to surfaces of repaired tooth 102. For example, plug tip surface 39 may be fabricated on the basis of digital scan data.

Custom tool 10 combines with tooth 102 to form a mold cavity of mold body 12 encompassing missing tooth structure of tooth 102 and/or a veneer for tooth 102. By positioning mold body 12 over tooth 102, restorative dental material may be positioned into the mold cavities and take the form of the missing tooth structure of cavity 104.

Repair of tooth 102 occurs by filling the mold cavity with dental restoration material after positioning mold body 12 to register with tooth 102. The missing tooth structure may include any portion of tooth 102, including any combination of interproximal, occlusal, facial and/or lingual tooth structure. An inner surface of mold body 12 each include a portion of a mold cavity corresponding with at least one exterior surface of the corresponding tooth 102, the at least exterior surface may include facial, lingual, interproximal and/or occlusal surfaces of the corresponding tooth 102. In some examples, the mold cavities may facilitate a dental veneer restoration of facial, lingual, interproximal and/or occlusal surfaces of the corresponding tooth 102.

Custom tool 10 may be formed based on a digital model of the teeth and mouth of a patient, which can be produced an intra-oral 3D scan, such as a multi-channel scanner. In one particular example, custom tool 10 may be digitally designed using CAD software, such as solid modeling software based on the digital model. Custom tool 10 was designed to fit over tooth 102 (which may represent, by way of example, a molar) and a portion of the neighboring teeth 101, 103. Subsequently, the tooth structure of teeth 101, 102, 103 may be digitally subtracted from a mold block, as well as filling port 36. Alternatively, an inverse of the tooth structure may be inverted within software to define the mold block. Filling port 36 may be located in regions of tooth 102 which would ultimately be removed in the preparation process, e.g., adjacent cavity 104. Filling port 36 may be sized to receive a tip of a commercially available restorative dental material compule, to permit injection of the restorative dental material during filling.

The components within the CAD software may be converted into a 3D point mesh file or other format to facilitate production with a 3D printer, CNC mill, CAD/CAM milling processes, or otherwise. Orientation marks (e.g., a colored mark on the distal ends of each tool component) may be applied to the tool components to facilitate assembly. Production may optionally include other steps such as, curing (e.g., in a UV oven), cleaning, e.g., in alcohol solution, and/or assembly of various components, polishing of tooth surfaces, coating, such as with a clear acrylic to enhance visibility of the restoration area during injection of the restorative dental material. In addition, surfaces of tool components expected to be in contact with the restorative dental material could optionally be coated with a layer of release agent (e.g., a thin layer of petroleum jelly).

FIGS. 2-5 illustrate steps for using the custom tool 10 to form dental restorations of tooth 102 in a mouth of a patient. FIG. 2 illustrates a portion of the mouth of the patient that includes teeth 101, 102, and 103 as well as gingiva 110. Tooth 102 includes cavity 104 in the crown of tooth 102. As shown, cavity 104 may have been caries previously prepared for the dental restoration by removing unhealthy tooth structure, e.g., by drilling or other preparation to remove damaged dental material to facilitate dental restoration using tool 10. In some examples a 3D image of the mouth of the patient may be taken prior to the removal of decayed material from tooth 102 as the shape of the decayed material may help in the design of custom tool 10 or the restorative procedure may be shortened by utilizing scan data obtained at a time prior to preparation of the tooth. In different examples, the scan data may be obtained recently, such as within the past twelve months, or may be obtained a prior time, such as a period of greater than one year, greater than 5 years or even greater than 10 years ago. Such old scan data may demonstrate tooth wear over time and may facilitate restoration to repair such tooth wear. The scan data from multiple scans over time may also be used to detected tooth wear and facilitate an appropriate restoration.

An example restoration process for tooth 102 using custom tool 10 is described as follows. As shown in FIG. 3, mold body 12 is positioned in place over tooth 102 such that interproximal portions 16a, 16b extend between teeth 101, 102, 103. Mold body 12 provides a customized and secure placement within the mouth of the patient. In various examples, depending on the design of custom tool 10, mold body 12 may be positioned on the lingual, occlusal and/or facial sides of tooth 102.

As best illustrated in FIG. 4, restorative dental material 112 is positioned within the mold cavity formed by tooth 102 and mold body 12. Because the tooth preparations may prepared at a depth greater than the recommended maximum cure depth for the restorative dental material, or a different shade, viscosity or other property of restorative material is desired at deeper layers of the cavity, a base layer of restorative dental material can optionally be layered into the deep portions of the preparation and restorative dental material photocured, e.g., with an XL 3000 curing light. The components of tool 10, including mold body 12 and plug 38, may be transparent or translucent to facilitate photocuring. In such examples, restorative dental material 112 represents more than one layer of restorative dental material.

In any event, following the formation of restorative dental material 112 within mold cavities formed by tooth 102 and mold body 12, mold body 12 is removed from the mouth of the patient. As shown in FIG. 5, cavity 104 is now filled and the shape of the filling matches the occlusal surface of tooth 102. In this manner, mold body 12 not only provides a customized fit with the mouth of the patient, but also provides a customized mold cavity to facilitate repair of missing tooth structure of tooth 102 and/or application of a veneer to tooth 102.

The customized fit provided by mold body 12 is described with respect to FIG. 6. As shown in FIG. 6, one-piece mold body 12 includes customized surfaces for each of teeth 101, 102, 103. In particular, surface 15a is customized to fit with tooth 101, surface 13 is customized to fit with tooth 102, and surface 15b is customized to fit with tooth 103. Surface 13 provides a customized fit for more than one surface of tooth 102. In particular, surface 13 includes occlusal surface 32 corresponding with an occlusal surface of tooth 102, distal proximal surface 35 corresponding with a distal proximal of tooth 102, mesial proximal surface 31 corresponding with a mesial proximal of tooth 102, facial surface 34 corresponding with a facial surface of tooth 102 and lingual surface 33 corresponding to a lingual surface of tooth 102. Each of the areas of surface 13 of mold body 12 may be based on three-dimensional scan data of the mouth of the patient, as well as computerized design of a dental restoration of tooth 102.

Distal proximal surface 35 corresponding with a distal proximal of tooth 102, mesial proximal surface 31 corresponding with a mesial proximal of tooth 102 and lingual surface 33 corresponding to a lingual surface of tooth 102 may represent wrap portions of one-piece mold body 12 in that these areas of mold body 12 may engage with the lingual surface of tooth 102 to allow the custom tool 10 to snap onto tooth 102 to facilitate precise positioning of custom tool 10 on tooth 102.

As visible in FIG. 5, port 36 is optionally positioned adjacent occlusal surface 32 and facial surface 34. While the location of port 36 may be adjusted according to the location of the mold cavity placing port 36 on adjacent occlusal surface 32 and/or facial surface 34 may generally facilitate easier access by a practitioner during a dental restoration procedure than at other positions. The location of the port 36 can also be prescribed by the doctor prior to design of the mold 12 as an area targeted for build-up of excess material or excavation of undesired tooth structure.

The customized fit of mold body 12 may further serve to isolate tooth 102 from blood, gingival crevicular fluid, or saliva during a dental restoration material. For example, portions of mold body 12 may mate with surfaces of teeth 101, 102, 103 as well as gingiva 110 to shield the mold cavity from bodily fluids such as blood, gingival crevicular fluid, and saliva. In addition, mold body 12 may further serve to forcibly retract gingiva 110 and/or assisting in separating teeth 101, 102, 103 upon insertion of mold body 12 within the mouth of the patient. For example, interproximal portions 16a, 16b of mold body 12 may serve to forcibly separate adjacent teeth 101, 102, 103. In this manner, while custom tool 10 may be based on a three-dimensional model of the mouth of a patient, various features of custom tool 10 may be selected to temporarily modify the positions of gingiva 110 and/or teeth 101, 102, 103 during a restoration procedure.

Optionally, mold body 12 may be further configured to provide features, including customized gingival surfaces representing an isolation matrix for a dental restoration. In this manner, mold body 12 may contain features that extend subgingivally or into a hidden interproximal space. The data for these extensions can be based off of anatomical averages, or patient specific data, such as x-ray, ultrasound, or Mill. The tool may incorporate elastomeric material which can be designed for an undersized fit to create a tight seal against varying actual geometry of the patient's dentition. The materials used may also vary in hydrophilicity to draw water, saliva, and other fluids away from the tooth structure being restored. Microfluidic channels, vacuum line attachments and bite blocks can be incorporated as well.

While custom tool 10, including one-piece mold body 12 is described with respect to a single mold cavity for repair of a single tooth 102, the techniques described with respect to custom tool 10 may easily be applied to a custom tool configured to facilitate repair of more than one tooth by forming more than one mold cavity. In such examples, the modified custom tool 10 may include a one-piece mold body including a second occlusal portion forming a second occlusal surface corresponding with a second occlusal surface of an adjacent tooth, such as tooth 101, a second mesial proximal portion forming a second mesial proximal surface corresponding with a second mesial proximal surface of the adjacent tooth, and a second distal proximal portion forming a second distal proximal surface corresponding with a second distal proximal surface of the adjacent tooth. The one-piece mold body of the modified custom tool 10 may be configured to combine with the two adjacent teeth, (e.g., 101 and 102) to form separate mold cavities encompassing missing tooth structure for each of the adjacent teeth.

Figure 7:
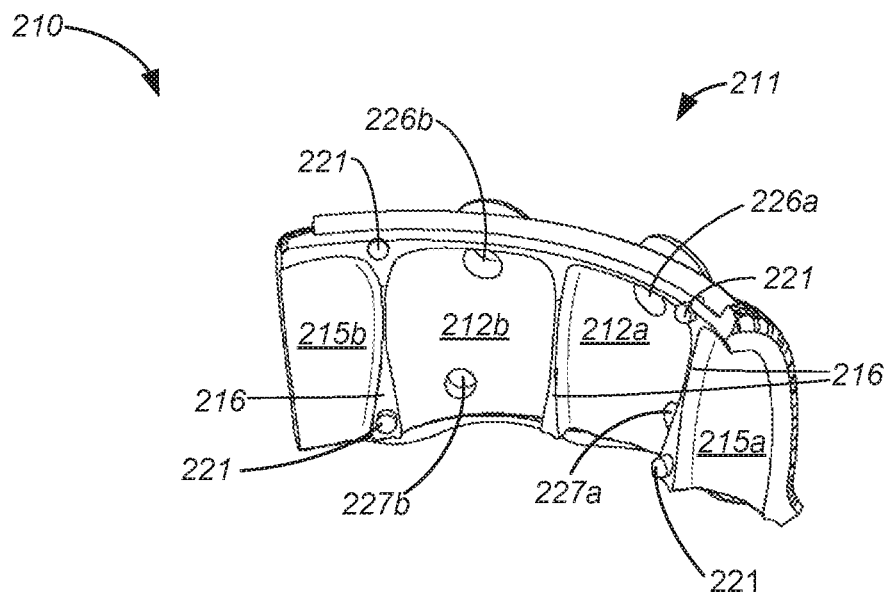
FIGS. 7-9 illustrate an alternative custom tool for forming dental restorations of two adjacent teeth in a mouth of a patient, the custom tool including two mating mold body components.
Figure 7:
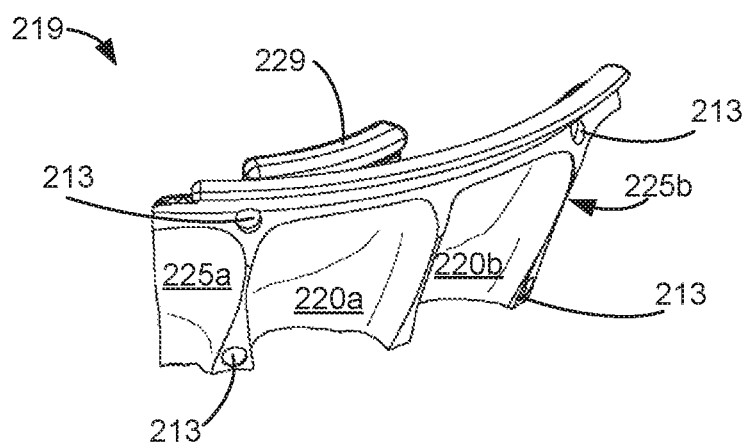
Figure 8:
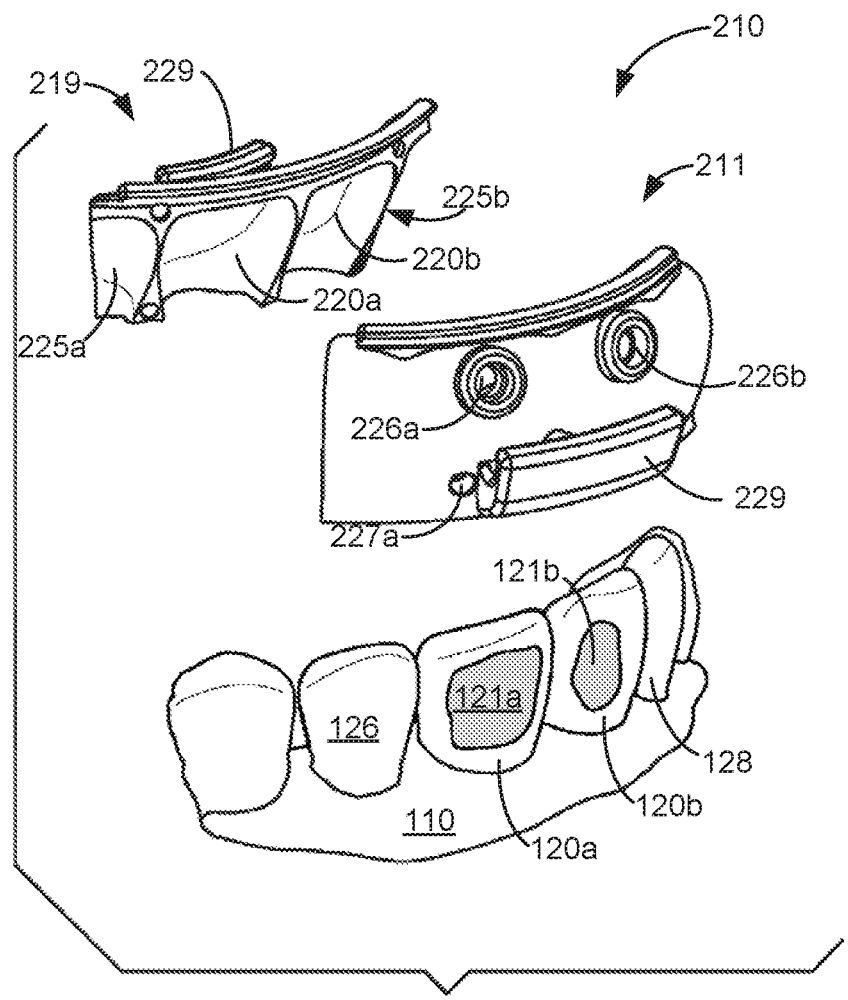
Figure 9:
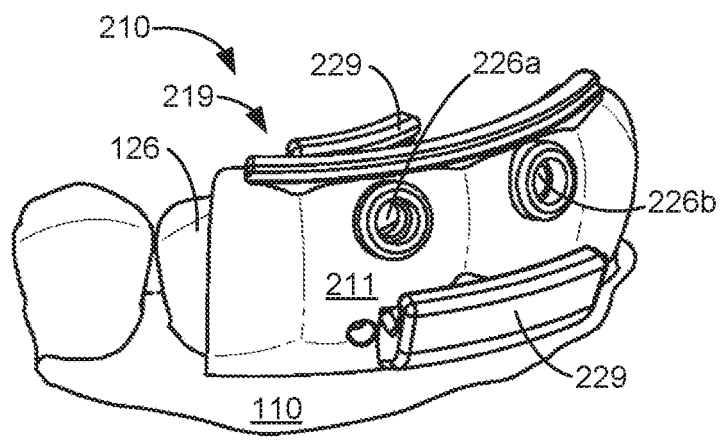

FIGS. 7-9 illustrate an alternative custom tool 210 for forming dental restorations of two adjacent teeth 120a, 120b (collectively, "teeth 120") in a mouth of a patient. In particular, FIG. 7 illustrates the components of custom tool 210, including one-piece mold body component 211 and support member 219. FIG. 8 illustrates the components of custom tool 210 as well as a portion of the mouth of a patient. FIG. 9 illustrates the components of custom tool 210 assembled within the mouth of a patient to facilitate a dental restoration. While custom tool 210 is configured to facilitate dental restorations of two adjacent teeth, custom tool 210 is merely one example, and the techniques described with respect to custom tool 210 can readily be applied to custom tools that facilitate repair of a single tooth or more than two teeth.

Custom tool 210 includes one-piece mold body component 211, which includes first mold body 212a and second mold body 212b (collectively, "mold bodies 212"). Mold bodies 212 each provide a customized fit with at least one tooth of the patient. As shown in FIG. 8, mold body 212a provides a customized fit with tooth 120a, and mold body 212b provides a customized fit with tooth 120b. Mold body component 211 further includes optional customized surface 215a, which provides a customized fit with tooth 126 and optional customized surface 215b, which provides a customized fit with tooth 128. Customized surfaces 215a, 215b may further secure and register mold bodies 212 in place within a patient's mouth to facilitate precise customized dental restorations of teeth 120. Mold body component 211 may further register with gingiva 110 of the patient.

Optionally, mold bodies 212 may be further configured to provide features, including customized gingival surfaces representing an isolation matrix for a dental restoration. In this manner, mold bodies 212 may contain features that extend subgingivally or into hidden interproximal space. The data for these extensions can be based off of anatomical averages, or patient x-ray data. The tool may incorporate elastomeric material which can be designed for an undersized fit to create a tight seal against varying actual geometry of the patient's dentition. The materials used may also vary in hydrophillicity to draw water, saliva, and other fluids away from the tooth structure being restored. Microfluidic channels, vacuum line attachments and bite blocks can be incorporated as well.

The customized fit of mold bodies 212 may further serve to isolate teeth 120 from blood or saliva during a dental restoration material. For example, portions of mold bodies 212 may mate with surfaces of teeth 120, 126, 128 as well as gingiva 110 to shield the mold cavity from bodily fluids such as blood and saliva. In addition, mold bodies 212 may further serve to forcibly retract gingiva 110 and/or separate teeth 120, 126, 128 upon insertion of mold body component 211 within the mouth of the patient. For example, interproximal portions 216 of mold bodies 212 may serve to forcibly separate adjacent teeth. In this manner, while custom tool 210 may be based on a three-dimensional model of the mouth of a patient, various features of custom tool 210 may be selected to temporarily modify the positions of gingiva 110 and/or teeth 120, 126, 128 during a restoration procedure.

Custom tool 210 further includes optional support body component 219. Support body component 219 includes first support body 220a and second support body 220b (collectively, "support bodies 220"), which are engageable with, and provide support for, mold bodies 212 via snap fit connections. For example, support bodies 220 may not provide any portion of the mold cavities, but may instead simply help secure mold body component 211 including mold bodies 212 in place. Support bodies 220 include snap fit elements 221 that mate with corresponding snap fit elements 213 of mold bodies 212.

Both mold body component 211 and support body component 219 may include surfaces that register with the teeth of the patient, as well as gingiva 110 of the patient. For example, as described above mold body 212a may include features that register with tooth 120 and tooth 126, whereas mold body 212b may include features that register with tooth 120 and tooth 128. Likewise, support body 220a may include features that register with tooth 120 and tooth 126, whereas support body 220b may include features that register with tooth 120 and tooth 128. Support body component 219 further includes optional customized surface 225a, which provides a customized fit with tooth 126 and optional customized surface 225b, which provides a customized fit with tooth 128. Customized surfaces 225a, 225b may further secure and register mold bodies 212 in place within a patient's mouth to facilitate precise customized dental restorations of teeth 120. Support body component 219 may further register with gingiva 110 of the patient. In this manner, mold bodies 212 and support bodies 220 may provide multiple customized surfaces that mate with corresponding surfaces of teeth 120, 126, 128 as well as gingiva 110 of the patient. The combination of mold body component 211 and support body component 219 provides a secure fit within the mouth of the patient to precisely align mold bodies 212 with teeth 120 in order to facilitate dental restorations of teeth 120.

While support bodies 220 are described as not forming any portion of mold cavity, in other examples, the support bodies 220 may be readily modified to combine with mold bodies 212 to form one or more mold cavities. In such examples, the modified support bodies 220 should also be considered mold bodies.

Mold bodies 212 further include injection ports 226a, 226b (collectively, "ports 226") for delivery of restorative dental material to mold cavities. Ports 226 are configured to accept injection of a restorative dental material for mold cavities adjacent teeth 120. Mold bodies 212 further include vent ports 227a, 227b (collectively, "vent ports 227") to allow air and excess dental material to escape the mold cavities as material is injected via fill ports 226.

Custom tool 210 combines with teeth 120 to form two distinct mold cavities of mold bodies 212. Mold cavities of mold bodies 212 encompass missing tooth structures 121a, 121b (collectively, "tooth structures 121") of teeth 120 and/or a veneer for one or both of teeth 120. By positioning mold body component 211 over teeth 120, restorative dental material may be positioned into the mold cavities and take the form of tooth structures 121 and/or provide a veneer on the surfaces of teeth 120.

Repair of teeth 120 occurs by filling the mold cavities with dental restoration material after positioning mold bodies 212 to register with teeth 120. Optionally, the filling material may be applied to the tooth and/or mold cavity prior to positioning mold bodies 12 to register with teeth 102. In such examples, the process of seating the mold body shapes the restorative material into the desired shape. Missing tooth structures 121 may include any portion of teeth 120, including any combination of interproximal, occlusal, facial and/or lingual tooth structure, although in the example of FIGS. 7-9, the missing tooth structures 121 are depicted on the facial side of teeth 120. An inner surface of mold bodies 212 each include a portion of a mold cavity corresponding with at least one exterior surface of the corresponding tooth 120, the at least exterior surface may include facial, lingual, interproximal and/or occlusal surfaces of the corresponding tooth 120. In some examples, the mold cavities may facilitate dental veneer restoration of facial, lingual, interproximal and/or occlusal surfaces of the corresponding tooth 120.

Custom tool 210 may be formed based on a digital model of the teeth and mouth of a patient, which can be produced an intra-oral 3D scan, such as a multi-channel scanner. In one particular example, custom tool 210 may be digitally designed using CAD software, such as solid modeling software based on the digital model. Custom tool 210 was designed to fit over teeth 120 (which may represent, by way of example, adjacent incisors) and a portion of the neighboring teeth 126, 128. Subsequently, the tooth structure of teeth 120, 126, 128 may be digitally subtracted from a mold block, as well as filling ports 226 and optional vent ports 227. Alternatively, an inverse of the tooth structure may be inverted within software to define the mold block. Filling ports 226 may be located in regions of the occlusal section which correspond to regions of the teeth which would ultimately be removed in the preparation process, e.g., adjacent to the mold cavities of teeth 120. Filling ports 226 may be sized to receive a tip of a commercially available restorative dental material compule, to permit injection of the restorative dental material during filling. Vent ports 227 may be sized smaller in diameter than filling ports 226.

Within the digital model, the mold block design may be segmented into two sections (mold body component 211 and support body component 219) to facilitate eventual assembly of the tool components on the teeth without geometric interference. Within the digital model, handle features 229 may be included added to mold body component 211 and support body component 219 to facilitate holding of the portions with a hemostat or cotton pliers during dental restoration using tool 210.

The components within the CAD software may be converted into a 3D point mesh file or other format to facilitate production with a 3D printer, CNC mill, CAD/CAM milling processes, or otherwise. Orientation marks (e.g., a colored mark on the distal ends of each tool component) may be applied to the tool components to facilitate assembly. Production may optionally include other steps such as, curing (e.g., in a UV oven), cleaning, e.g., in alcohol solution, and/or assembly of various components, polishing of tooth surfaces, coating, such as with a clear acrylic to enhance visibility of the restoration area during injection of the restorative dental material. In addition, surfaces of tool components expected to be in contact with the restorative dental material could optionally be coated with a layer of release agent (e.g., a thin layer of petroleum jelly).

Figure 10:
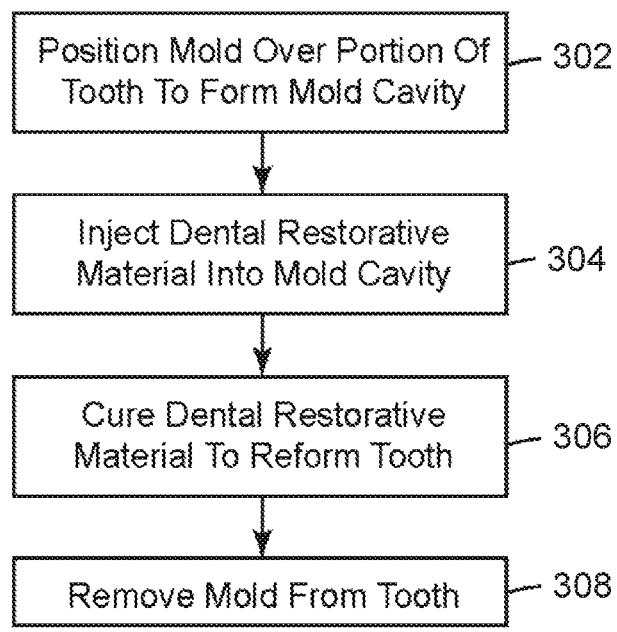
FIG. 10 is a flowchart illustrating an example technique for forming a dental restoration in a mouth of a patient.

FIG. 10 is a flowchart illustrating an example technique for forming a dental restoration in a mouth of a patient. First, a practitioner positions a mold, such as mold body 12 or mold body component 211, over a portion of a tooth of the patient (302). The tooth either contains missing tooth structure or has been prepared to create missing tooth structure, such as is commonly done in the caries removal process. The mold combines with the tooth to form a mold cavity encompassing missing tooth structure of the tooth. Next a practitioner injects a restorative dental material within the mold cavity (304). The practitioner allows the restorative dental material to cure within the mold cavity to reform the tooth, which may include application of actinic radiation to cure the restorative dental material (306). The practitioner removes the mold from the tooth of the patient leaving the dental restoration with a shape defined by the mold cavity on the tooth of the patient (308).

Figure 11:
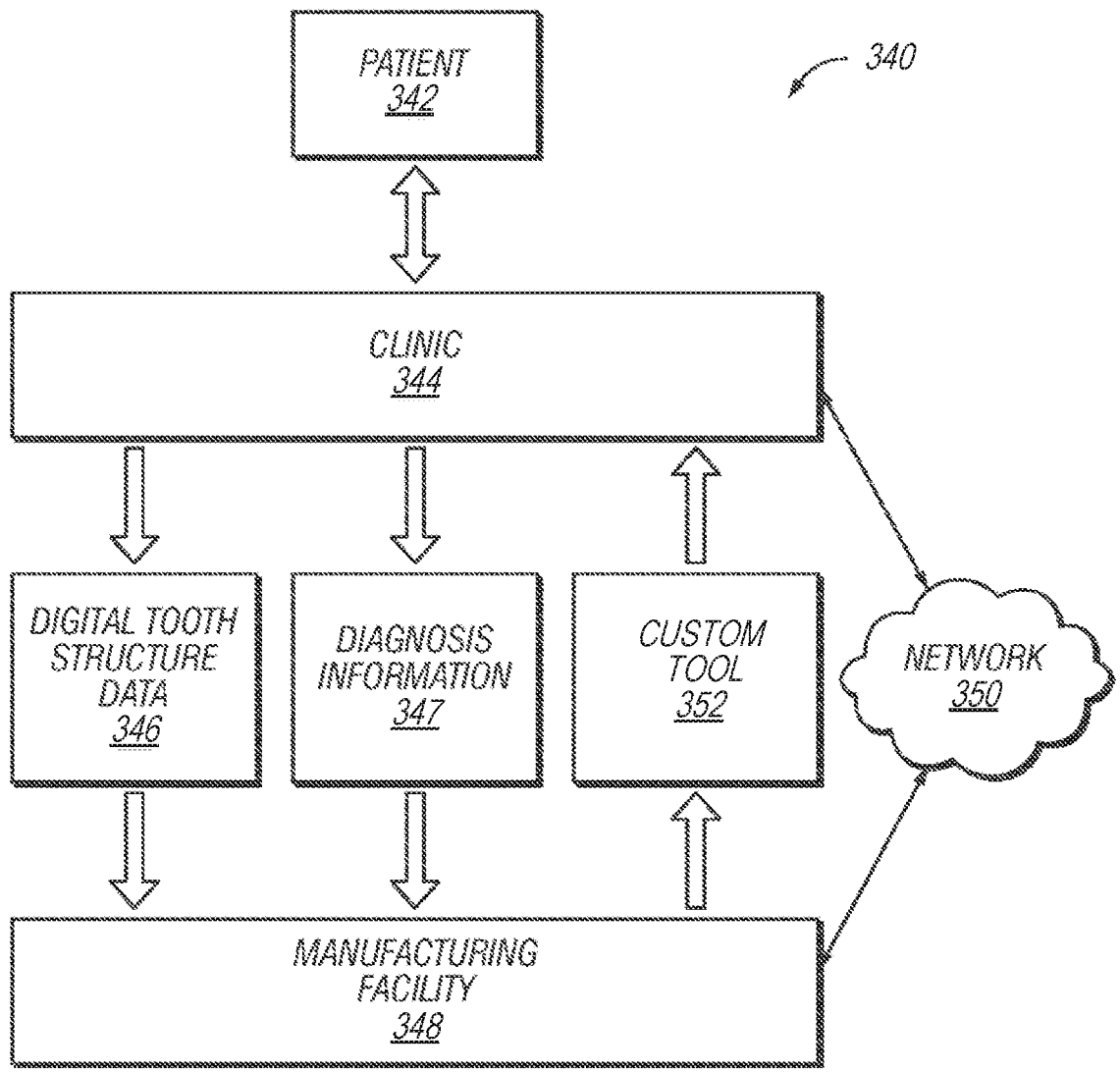
FIG. 11 is a block diagram illustrating an example computer environment in which a clinic and manufacturing facility communicate information throughout a custom tool manufacturing process.

FIG. 11 is a block diagram illustrating an example computer environment 340 in which clinic 344 and manufacturing facility 348 communicate information throughout a manufacturing process of custom tool 10 and/or custom tool 210 for patient 342. Initially, an dental practitioner of clinic 344 generates one or more images of a dental structure of patient 342 using any suitable imaging technique and generates digital dental structure data 346 (e.g., a digital representation of patient's 342 tooth structure and, optionally, mouth tissues such as gingiva 110). For example, the practitioner may generate X-RAY images that can be digitally scanned. Alternatively, the practitioner may capture digital images of the patient tooth structure using, for example, conventional computed tomography (CT), laser scanning, intra-oral scanning, CT scans of dental impressions, scans of dental casts poured from impressions, ultrasound instrumentation, magnetic resonance imaging (MM), or any other suitable method of 3D data acquisition. In other embodiments, the digital images may be provided using a hand-held intra-oral scanner such as the intra-oral scanner using active wavefront sampling developed by Brontes Technologies, Inc. (Lexington, Mass.) and described in PCT Publication No. WO 2007/084727 (Boerjes, et al.), which is incorporated by reference herein. Alternatively, other intra-oral scanners or intra-oral contact probes may be used. As another option, the digital structure data 346 may be provided by scanning a negative impression of the patient's teeth. As still another option, the digital structure data 346 may be provided by imaging a positive physical model of the patient's teeth or by using a contact probe on a model of the patient's teeth. The model used for scanning may be made, for example, by casting an impression of a patient's dentition from a suitable impression material such as alginate or polyvinylsiloxane (PVS), pouring a casting material (such as dental stone or epoxy resin) into the impression, and allowing the casting material to cure. Any suitable scanning technique may be used for scanning the model, including those described above. Other possible scanning methods are described in U.S. Patent Publication No. 2007/0031791 (Cinader et al.), which is incorporated by reference herein.

In addition to providing digital images by scanning the exposed surfaces of the teeth, it is possible to image hidden features of the dentition, such as the roots of the patient's teeth and the patient's jaw bones. In some embodiments, the digital tooth structure data is formed by providing several 3D images of these features and subsequently "stitching" them together. These different images need not be provided using the same imaging technique. For example, a digital image of teeth roots provided with a CT scan may be integrated with a digital image of the teeth crowns provided with an intraoral visible light scanner. Scaling and registering of 2D dental images with 3D dental images is described in U.S. Pat. No. 6,845,175 (Kopelman, et al.), which is incorporated by reference herein, and U.S. Patent Publication No. 2004/0029068 (Badura et al.), which is also incorporated by reference herein. Issued U.S. Pat. No. 7,027,642 (Imgrund et al.), which is incorporated by reference herein, and U.S. Pat. No. 7,234,937 (Sachdeva, et al.), which is also incorporated by reference herein, describe using techniques of integrating digital images provided from various 3D sources. Accordingly, the term "imaging" as it is used herein is not limited to normal photographic imaging of visually apparent structures, but includes imaging of dental structures that are hidden from view. The dental structure may include, but is not limited to, any portion of crowns and/or roots of one or more teeth of a dental arch, gingiva, periodontal ligaments, alveolar bone, cortical bone, implants, artificial crowns, bridges, veneers, dentures, dental appliances, or any structure that could be considered part of the dentition before, during, or after treatment.

In order to generate digital tooth structure data 346, a computer must transform raw data from the imaging systems into usable digital models. For example, for raw data representing the shapes of teeth received by a computer, the raw data is often little more than a point cloud in 3D space. Typically, this point cloud is surfaced to create 3D object models of the patient's dentition, including one or more teeth, gingival tissue, and other surrounding oral structure. In order for this data to be useful in dental diagnosis and treatment, the computer may "segment" dentition surfaces to produce one or more discrete, movable 3D tooth object models representing individual teeth. The computer may further separate these tooth models from the gingiva into separate objects. Segmentation allows a user to characterize and manipulate the teeth arrangement as a set of individual objects.

After generating digital dental structure data 346, clinic 344 may store digital dental structure data 346 within a patient record in a database. Clinic 344 may, for example, update a local database having a plurality of patient records. Alternatively, clinic 344 may remotely update a central database (optionally within manufacturing facility 348) via network 350. After digital tooth structure data 346 is stored, clinic 344 electronically communicates digital dental structure data 346 to manufacturing facility 348. Alternatively, manufacturing facility 348 may retrieve digital dental structure data 346 from the central database.

Clinic 344 may also forward treatment data 347 conveying general information regarding a practitioner's diagnosis and treatment plan for patient 342 to manufacturing facility 348. In some examples, treatment data 347 may be more specific. For example, digital dental structure data 346 may be a digital representation of the dental structure of patient 342, and the practitioner of clinic 344 may review the digital representation and indicate desired repairs, including locations for veneers, crowns or fillings for individual teeth of patient 342 prior to forwarding digital dental structure data 346 to manufacturing facility 348. The doctor and manufacturing facility may also engage in an iterative process to arrive at the proper treatment plan. Such interactions may be facilitated by digital communication such as via the Treatment Management Portal offered by 3M Oral Care. Manufacturing facility 348 may be located off-site, or located with clinic 344.

For example, each clinic 344 may include its own equipment for manufacturing facility 348 such that a treatment plan and digital design may be performed entirely by a clinical practitioner, or an assistant, in the clinical setting, using software installed locally. The manufacturing may be performed in the clinic, as well, by using a 3D printer (or by other methods of additive manufacturing). In other examples, a remote manufacturing facility may process the three dimensional scan data of a patient and produce a digital model of a design for a custom tool for forming the dental restoration of the tooth based on the three dimensional scan data of the mouth of the patient. The remote manufacturing facility may then return the digital model of a design for a custom tool for forming the dental restoration of the tooth to the clinic 344.

A 3D printer allows manufacturing of intricate features of a custom tool or a physical representation of the dental structure of patient 342 through additive printing. The 3D printer may use iterative digital designs of original dental structure of patient 342 as well as a desired dental structure of patient 342 to produce multiple custom tools and/or custom tool patterns customized to produce the desired dental structure of patient 342. Manufacturing may include post-processing to remove uncured resin and remove support structures, or to assemble various components, which may also be necessary and could also be performed in a clinical setting. Alternatively, manufacturing can be performed by subtractive manufacturing, such as CAD/CAM mills.

Manufacturing facility 348 utilizes digital dental structure data 346 of patient 342 to construct custom tool 10 and/or custom tool 210 in order to repair teeth of patient 342. Sometime thereafter, manufacturing facility 348 forwards custom tool 10 and/or custom tool 210 to clinic 344.

Figure 12:
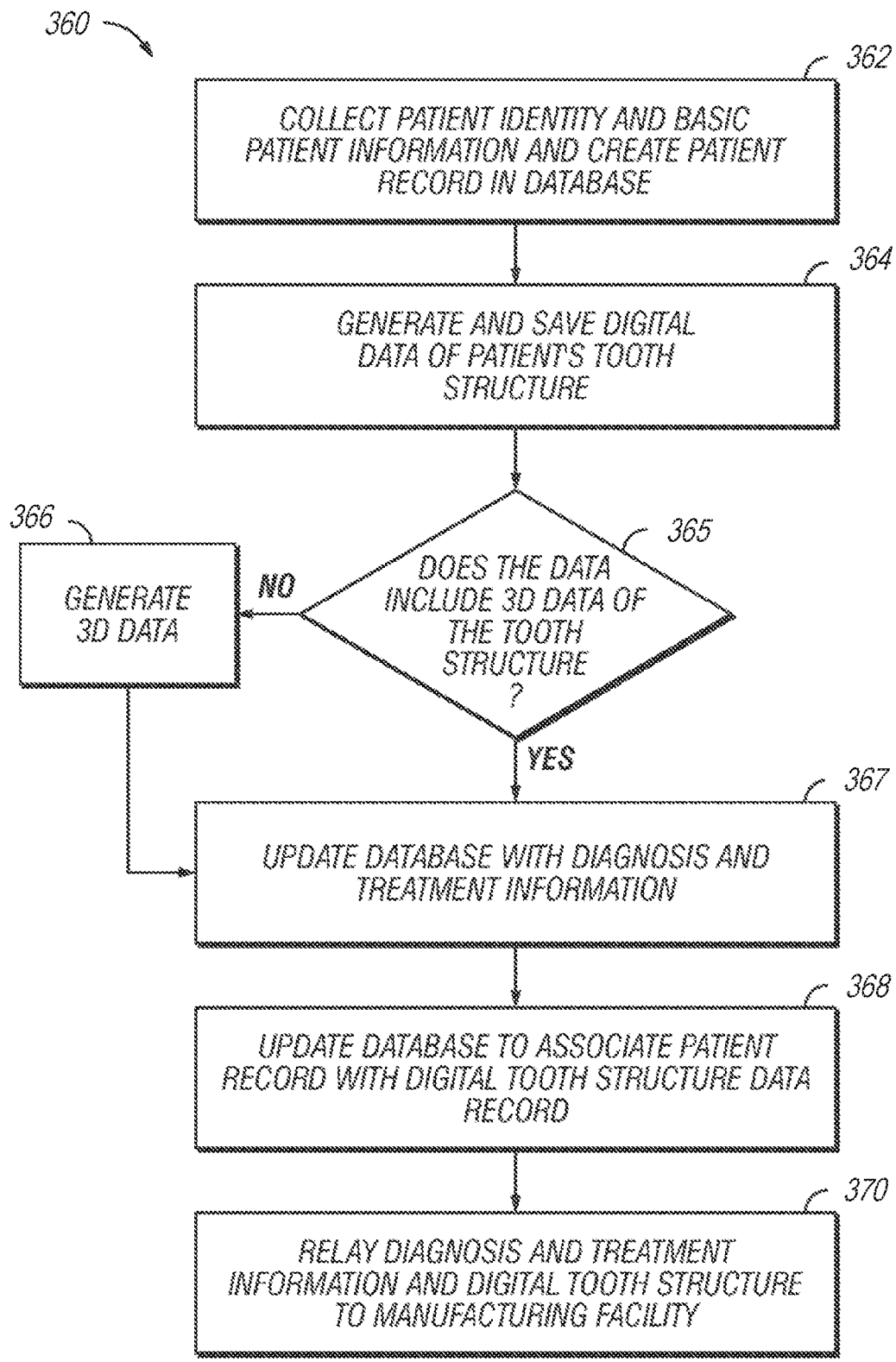
FIG. 12 is a flow diagram illustrating a process conducted at the clinic in accordance with one example of this disclosure.

FIG. 12 is a flow diagram illustrating process 360 conducted at clinic 344 in accordance with one example of this disclosure. Initially, a practitioner at clinic 344 collects patient identity and other information from patient 342 and creates a patient record (362). As described, the patient record may be located within clinic 344 and optionally configured to share data with a database within manufacturing facility 348. Alternatively, the patient record may be located within a database at manufacturing facility 348 that is remotely accessible to clinic 344 via network 350 or within a database that is remotely accessible by both manufacturing facility 348 and clinic 344.

Next, digital data 346 of the dental structure of patient 342 may be generated using any suitable technique (364), to thereby create a virtual dental structure. Digital data 346 may be comprised of a two-dimensional (2D) image and/or a three-dimensional (3D) representation of the dental structure.

In one example, 3D representations of a dental structure are generated using a cone beam computerized tomography (CBCT) scanner, such as an i-CAT 3D dental imaging device, which is available from Imaging Sciences International, LLC; 1910 N Penn Road, Hatfield, Pa. Clinic 344 stores the 3D data 346 (in the form of radiological images) generated from the CBCT scanner in the database located within clinic 344, or alternatively, within manufacturing facility 348. The computing system processes the digital data 346 from the CBCT scanner, which may be in the form of a plurality of slices, to compute a digital representation of the tooth structure that may be manipulated within the 3D modeling environment.

If 2D radiological images are used (365), then the practitioner may further generate 3D digital data (366). The 3D data 346 may be produced by, for example, forming and subsequently digitally scanning a physical impression or casting of the tooth structure of patient 342. For example, a physical impression or casting of teeth of patient 342 may be scanned using a visible light scanner, such as an OM-3R scanner available from Laser Design, Inc. of Minneapolis, Minn. Alternatively, the practitioner may generate the 3D data 346 of the occlusal service by use of an intra-oral scan of the teeth of patient 342, or existing 3D tooth data. In one example, the method of forming a digital scan from a casting or an impression described in U.S. Pat. No. 8,491,306, titled, "REGISTERING PHYSICAL AND VIRTUAL TOOTH STRUCTURES WITH PEDESTALS," and issued on Jul. 23, 2013, may be used. U.S. Pat. No. 8,491,306 is herein incorporated by reference in its entirety. In the same or different examples, techniques for defining a virtual tooth surface and virtual tooth coordinate system as described in U.S. Patent Application Publication No. 2013/0325431, titled DENTAL DIGITAL SETUPS," and published on Dec. 5, 2013 may be used. U.S. Patent Application Publication No. 2013/0325431 is herein incorporated by reference in its entirety. In any case, the digital data are digitally registered within the 3D modeling environment to form a composite digital representation of a tooth structure, which may include the tooth roots as well as the occlusal surfaces.

In one example, 2D radiological images and the 3D digital data for the occlusal surface of the teeth are registered by first attaching registration markers (e.g., fiducial markers or a pedestal having known geometry) to the tooth structure of patient 342 prior to generating both the radiological images and the 3D digital scan. Thereafter, the digital representation of the registration markers within the 2D radiological image and the 3D digital data may be aligned within a 3D modeling environment using registration techniques described in U.S. Pat. No. 8,491,306.

In another example, 3D digital data of the tooth structure is generated by combining two 3D digital representations of the tooth structure. For example, a first 3D digital representation may be a relatively low resolution image of the roots obtained from a CBCT scanner (e.g., an i-CAT 3D dental imaging device) and the second 3D digital representation may be a relatively high resolution image of the crowns of the teeth obtained from an industrial CT scan of an impression or a visible light (e.g., laser) scan of a casting of the teeth of the patient. The 3D digital representations may be registered using a software program that enables the 3D representations to be manipulated within a computer environment (e.g., Geomagic Studio software, available from 3D Systems, Inc.; 333 Three D Systems Circle, Rock Hill, S.C.), or alternatively, registration techniques described in U.S. Pat. No. 8,491,306 may be used.

Next, a computer system executing 3D modeling software renders a resultant digital representation of the tooth structure, including the occlusal surface, and, optionally, the root structure of the patient's teeth. Modeling software may provide a user interface that allows the practitioner to manipulate digital representations of the teeth in 3D space relative to the digital representation of the patient's teeth. By interacting with the computer system, the practitioner generates treatment information, such as by selecting areas of repair of the teeth of patient 342 (367).

Once the practitioner has finished conveying general information regarding a diagnosis and treatment plan within the 3D environment, the computer system updates the database associated with the patient record to record the treatment data 347 conveying general information regarding a diagnosis and treatment plan as specified by the practitioner (368). Thereafter, the treatment data 347 is relayed to manufacturing facility 348 in order for manufacturing facility 348 to construct one or more custom tools, such as custom tool 10 and/or custom tool 210 (370).

Although described with respect to an dental practitioner located at an dental clinic, one or more of the steps discussed with respect to FIG. 12 may be performed by a remote user, such as a user located at manufacturing facility 348. For example, the dental practitioner may only send radiological image data and an impression or casting of the patient to manufacturing facility 348, where a user interacts with a computer system to develop a treatment plan within a 3D modeling environment. Optionally, a digital representation of the treatment plan within the 3D modeling environment may then be transmitted to the dental practitioner of clinic 344, who may review the treatment plan and either send back his or her approval, or indicate desired changes. An additional option would be for the manufacturing facility to create the digital design of the tool which is then returned to the clinic for production on system in the clinic (e.g. 3D printer or mill).

Figure 13:
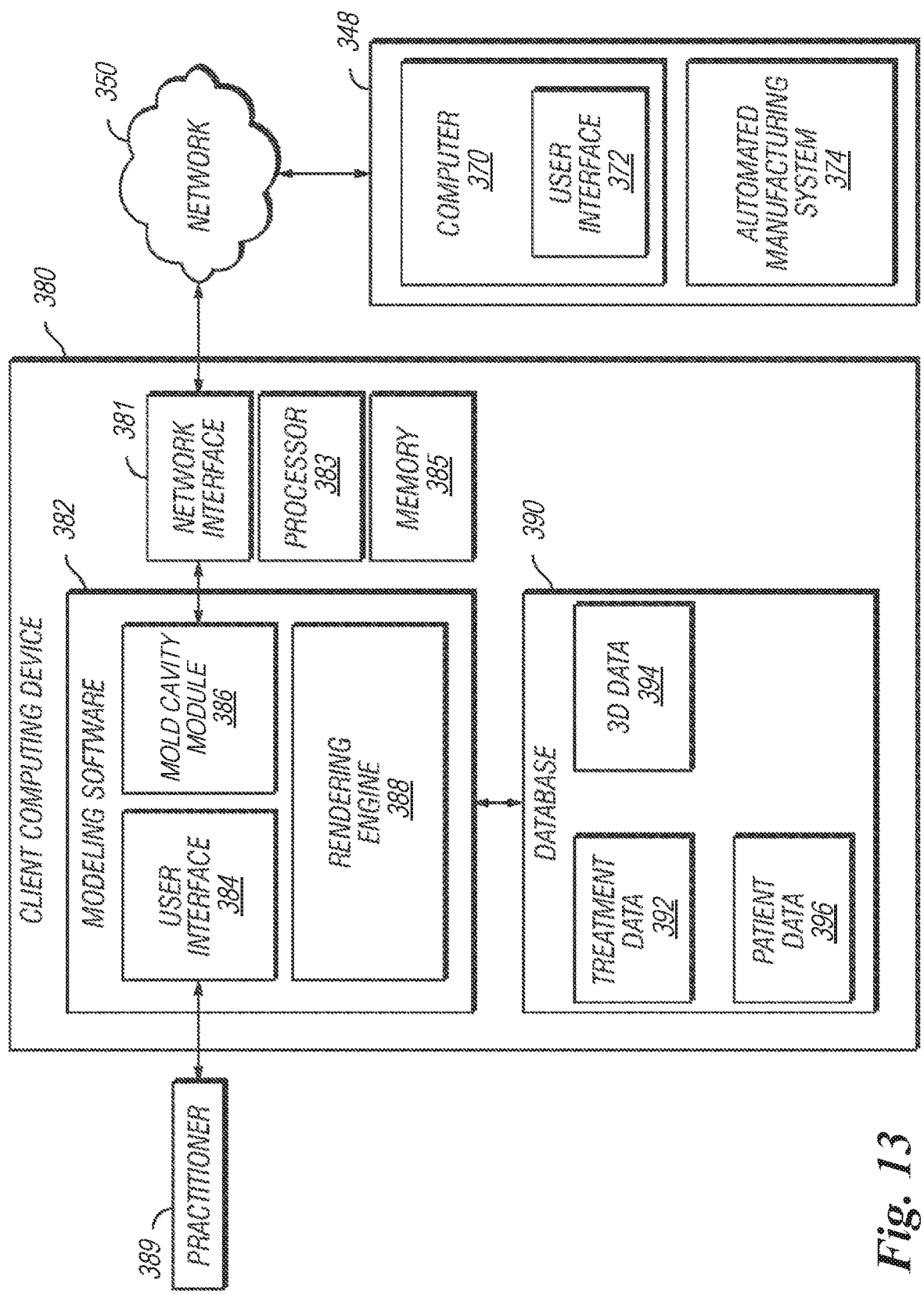
FIG. 13 is a block diagram illustrating an example of a client computing device connected to a manufacturing facility via a network.

FIG. 13 is a block diagram illustrating an example of a client computing device 380 connected to manufacturing facility 348 via network 350. In the illustrated example, client computing device 380 provides an operating environment for modeling software 382. Modeling software 382 presents a modeling environment for modeling and depicting the 3D representation of the teeth of patient 342. In the illustrated example, modeling software 382 includes user interface 384, mold cavity module 386, and rendering engine 388.

User interface 384 provides a graphical user interface (GUI) that visually displays the 3D representation of patient 342's teeth. In addition, user interface 384 provides an interface for receiving input from practitioner 389 of clinic 344 (FIG. 11), e.g., via a keyboard and a pointing device, for manipulating patient 342's teeth within the model, e.g., to select portions for repair, and/or adjust the surfaces of a mold cavity that define the exterior repaired surface of patient 342's teeth as provided by custom tool 10 and/or custom tool 210.

Modeling software 382 may be accessible to manufacturing facility 348 via network interface 381. Modeling software 382 interacts with database 390 to access a variety of data, such as treatment data 392, 3D data 394 relating to the tooth structure of patient 342, and patient data 396. Database 390 may be represented in a variety of forms including data storage files, lookup tables, or a database management system (DBMS) executing on one or more database servers. The database management system may be a relational (RDBMS), hierarchical (HDBMS), multi-dimensional (MDBMS), object oriented (ODBMS or OODBMS) or object relational (ORDBMS) database management system. The data may, for example, be stored within a single relational database, such as SQL Server from Microsoft Corporation. Although illustrated as local to client computer device 380, database 390 may be located remote from the client computing device and coupled to the client computing device via a public or private network, e.g., network 350. Treatment data 392 describes a diagnosis and or repair information of the teeth of patient 342 selected by practitioner 389 and positioned within the 3D modeling environment.

Patient data 396 describes a set of one or more patients, e.g., patient 342, associated with practitioner 389. For example, patient data 396 specifies general information, such as a name, birth date, and a dental history, for each patient.

Rendering engine 388 accesses and renders 3D data 394 to generate the 3D view presented to practitioner 389 by user interface 384. More specifically, 3D data 394 includes information defining the 3D objects that represent each tooth (optionally including roots), and jaw bone within the 3D environment. Rendering engine 388 processes each object to render a 3D triangular mesh based on viewing perspective of practitioner 389 within the 3D environment. User interface 384 displays the rendered 3D triangular mesh to practitioner 389, and allows practitioner 389 to change viewing perspectives and manipulate objects within the 3D environment.

U.S. Pat. No. 8,194,067, titled, "PLANAR GUIDES TO VISUALLY AID DENTAL APPLIANCE PLACEMENT WITHIN A THREE-DIMENSIONAL (3D) ENVIRONMENT," issued on Jun. 5, 2012, and U.S. Pat. No. 7,731,495, titled, "USER INTERFACE HAVING CROSS SECTION CONTROL TOOL FOR DIGITAL DENTALS," issued on Jun. 8, 2010, describe other examples for computer systems and 3D modeling software having user interfaces that may be used with the techniques described herein, each of which are incorporated by reference in their entireties.

Client computing device 380 includes processor 383 and memory 385 in order to store and execute modeling software 382. Memory 385 may represent any volatile or non-volatile storage elements. Examples include random access memory (RAM) such as synchronous dynamic random access memory (SDRAM), read-only memory (ROM), non-volatile random access memory (NVRAM), electrically erasable programmable read-only memory (EEPROM), and FLASH memory. Examples may also include non-volatile storage, such as a hard-disk, magnetic tape, a magnetic or optical data storage media, a compact disk (CD), a digital versatile disk (DVD), a Blu-ray disk, and a holographic data storage media.

Processor 383 represents one or more processors such as a general-purpose microprocessor, a specially designed processor, an application specific integrated circuit (ASIC), a field programmable gate array (FPGA), a collection of discrete logic, or any type of processing device capable of executing the techniques described herein. In one example, memory 385 may store program instructions (e.g., software instructions) that are executed by processor 383 to carry out the techniques described herein. In other examples, the techniques may be executed by specifically programmed circuitry of processor 383. In these or other ways, processor 383 may be configured to execute the techniques described herein.

Client computing device 380 is configured to send a digital representation of a 3D tooth structure of a patient, and optionally, treatment data 392 and/or patient data 396 to computer 370 of manufacturing facility 348 via network 350. Computer 370 includes user interface 372. User interface 372 provides a GUI that visually displays the 3D representation of the digital model of teeth. In addition, user interface 372 provides an interface for receiving input from a user, e.g., via a keyboard and a pointing device, for manipulating a patient's teeth within the digital representation of the 3D tooth structure of the patient.

Computer 370 may further be configured to determine dimensions and shapes a custom tool, the dimensions and shapes of the custom tool being configured to provide one or more mold bodies and mold cavities repair the one or more teeth of the patient. Computer 370 may provide the dimensions and shapes of the custom tool to automated manufacturing system 374 for production of the custom tool.

Client computing device 380 and computer 370 are merely conceptual representations of an example computer system. In some examples, the functionalities described with respect to of client computing device 380 and/or computer 370 may be combined into a single computing device or distributed among multiple computing devices within a computer system. For example, cloud computing may be used for digital design of custom tools described herein. In one example, the digital representations of tooth structures are received at one computer at the clinic, while a different computer, such as computer 370, is used to determine the shapes and dimensions of a custom tool. In addition, it may not be necessary for that different computer, such as computer 370, to receive all of the same data in order for it to determine shapes and dimensions. Shapes and dimensions may be determined, at least in part, based on knowledge derived through analysis of historical cases or virtual models of exemplary cases, without receiving a complete 3D representation of the case in question. In such an example, data transmitted between client computing device 380 and computer 370, or otherwise utilized to design a custom tool may be significantly less than the complete data set representing a complete digital dental model of a patient.

Various examples have been described. Modifications to the described examples may be made within the spirit of this disclosure. For example, custom tools can be fabricated off of initial tooth geometry or digitally optimized tooth geometry (e.g. hole filling close gaps in the data, pulling and scaling data from tooth libraries, testing in a virtual articulator). Tools can fit precisely to the existing structure or can be optimized to selectively move or position tissue. Custom tools can be formed without prior information of the where the tooth structure will be removed, such as when the extent of caries is not known. Custom tools may be formed to generate a digitally optimized tooth structure that will require the practitioner to remove tooth structure prior to application of the tool. Tools can be printed or milled. Tools can be made from the full range of 3D printed materials (strength, flexibility, translucency, color). Tools can be coated with a range of agents to optimize release, surface finish and optical transparency. Tools can contain features to indicate or define fill level of different restorative materials (shade, fill level, physical properties). Physical characteristics (elasticity, roughness, transparency, etc) of tools can vary across the tool to sealing capability, dimensional fidelity, texture imparted to restorative material, degree of cure of material, etc). Tools/mold sections can interlock with each other or with standard components (e.g. matrix bands). Tools can be used inside or outside of the mouth. Restorative material can be injected through ports in tools, applied to tooth structure and/or tool prior to the application of the tool, such that application shapes the material. Tools can be degradable (e.g. solvent/heat) to release from the restorative material or enable undercut geometries/reduce parting lines. Tools could be collapsible (deflated, frangible, etc.) Kits can be created of the patient specific tools and associated products and quantities, (e.g. adhesives, filling, and polishing materials selected for the patient needs and/or doctor preferences). Series of tools used sequentially in the direct filling process in order to control the geometries of multiple layers of a dental restoration on a tooth. Dental scans may be taken at diagnostic appointment to facilitate custom tools fabrication prior to a dental restoration appointment. Tools may be manufactured locally or digital scan data may be sent to a remote location for production.

These and other examples are within the scope of the following claims.

What is claimed is:

1. A custom tool for forming a dental restoration in a mouth of a patient, the custom tool comprising:
    a mold body providing for a customized fit with at least one tooth of the patient, the mold body including an occlusal portion forming an occlusal surface corresponding with an occlusal surface of the tooth, a mesial proximal portion forming a mesial proximal surface corresponding with a mesial proximal surface of the tooth, a distal proximal portion forming a distal proximal surface corresponding with a distal proximal surface of the tooth, and a port and a plug, wherein the plug includes a tip surface corresponding to a surface of the tooth, wherein the mold body is configured to combine with the tooth of the patient to form a mold cavity encompassing missing tooth structure of the tooth, wherein the occlusal portion, the mesial proximal portion, and the distal proximal portion are based on three-dimensional scan data of the mouth of the patient, and the occlusal portion, the mesial proximal portion, and the distal proximal portion form a one-piece portion that fits over the at least one tooth of the patient.

2. The custom tool of claim 1, wherein the occlusal portion, a mesial proximal portion and the distal proximal portion are all customized to fit around a tooth receiving a restoration.

3. The custom tool of claim 1, further including a wrap portion which engages with the lingual surface of the tooth to allow the custom tool to snap onto the tooth.

4. The custom tool of claim 1, further including a first interproximal portion including the mesial proximal surface, and a second interproximal portion including the distal proximal portion.

5. The custom tool of claim 4, wherein the first interproximal portion includes a distal proximal surface corresponding to a distal proximal surface of a first adjacent tooth, and the second interproximal portion includes a mesial proximal surface corresponding to the mesial proximal surface of a second adjacent tooth.

6. The custom tool of claim 5, wherein the first interproximal portion includes a first gingival surface and the second interproximal portion includes a second gingival surface.

7. The custom tool of claim 6, wherein first gingival surface and second gingival surface retract the gingiva from the tooth for a restoration of the tooth.

8. The custom tool of claim 1, wherein the mold body comprises a lingual surface corresponding with the lingual surface of the tooth.

9. The custom tool of claim 1, wherein the mold body provides for a customized fit for two adjacent teeth of the patient, the two adjacent teeth including the tooth and an adjacent tooth, the mold body including a second occlusal portion forming a second occlusal surface corresponding with a second occlusal surface of the adjacent tooth, a second mesial proximal portion forming a second mesial proximal surface corresponding with a second mesial proximal surface of the adjacent tooth, and a second distal proximal portion forming a second distal proximal surface corresponding with a second distal proximal surface of the adjacent tooth, and wherein the mold body is configured to combine with the two adjacent teeth of the patient to form separate mold cavities encompassing missing tooth structure for each of the two adjacent teeth.

10. The custom tool of claim 1, wherein the occlusal portion, the mesial proximal portion, and the distal proximal portion are manufactured by three-dimensional printing.

11. The custom tool of claim 1, wherein the occlusal portion, the mesial proximal portion, and the distal proximal portion together form an one-piece inner surface corresponding to the tooth's outer surface prior to restoration.

12. The custom tool of claim 1, further comprising a dental restorative material located within the mold cavity.

13. The custom tool of claim 1, wherein a first interproximal portion and a second interproximal portion assist in separating a first adjacent tooth and a second adjacent tooth from the at least one tooth.

14. The custom tool of claim 1, wherein a first interproximal portion and a second interproximal portion isolate the at least one tooth from blood or saliva.

15. The custom tool of claim 1, wherein the occlusal portion, the mesial proximal portion, and the distal proximal portion are manufactured by CAD/CAM milling processes.

16. The custom tool of claim 1, further including a facial and a lingual portion based on three-dimensional scan data of the mouth of the patient; and the facial portion extending from the occlusal portion between the mesial proximal portion and the distal proximal portion and the lingual portion extending from the occlusal portion opposite the facial portion between the mesial proximal portion and the distal proximal portion; and the occlusal portion, the mesial proximal portion, the distal proximal portion, the facial portion and the lingual portion form the one-piece portion that fits over the at least one tooth of the patient.

17. The custom tool of claim 16 further including the facial portion and the lingual portion that is three-dimensionally printed based on the three-dimensional scan data of the mouth of the patient.

18. A custom tool for forming a dental restoration in a mouth of a patient, the custom tool comprising:

a mold body providing for a customized fit with at least one tooth of the patient, the mold body including an incisal portion corresponding with the incisal surface of the tooth, a mesial proximal portion forming a mesial proximal surface corresponding with a mesial proximal surface of the tooth, and a distal proximal portion forming a distal proximal surface corresponding with a distal proximal surface of the tooth, and a port and a plug, wherein the plug includes a tip surface corresponding to a surface of the tooth, wherein the mold body is configured to combine with the tooth of the patient to form a mold cavity encompassing missing tooth structure of the tooth, wherein the incisal portion, the mesial proximal portion, and the distal proximal portion are based on three-dimensional scan data of the mouth of the patient, and the incisal portion, the mesial proximal portion, and the distal proximal portion form a one-piece portion that fits over the at least one tooth of the patient.

19. The custom tool of claim 18, wherein the incisal portion, the mesial proximal portion, and the distal proximal portion are all customized to fit around a tooth receiving a restoration.

20. The custom tool of claim 18, further including a wrap portion which engages with the lingual surface of the tooth to allow the custom tool to snap onto the tooth.

21. The custom tool of claim 18, further including a first interproximal portion including the mesial proximal surface, and a second interproximal portion including the distal proximal portion.

22. The custom tool of claim 21, wherein the first interproximal portion includes a distal proximal surface corresponding to a distal proximal surface of a first adjacent tooth, and the second interproximal portion includes a mesial proximal surface corresponding to the mesial proximal surface of a second adjacent tooth.

23. The custom tool of claim 22, wherein the first interproximal portion includes a first gingival surface and the second interproximal portion includes a second gingival surface.

24. The custom tool of claim 23, wherein the first gingival surface and second gingival surface retract the gingiva from the tooth for a restoration of the tooth.

25. The custom tool of claim 18, wherein the mold body comprises a lingual surface corresponding with the lingual surface of the tooth.

26. The custom tool of claim 18, wherein the mold body provides for a customized fit for two adjacent teeth of the patient, the two adjacent teeth including the tooth and an adjacent tooth, the mold body including a second incisal portion forming a second incisal surface corresponding with a second incisal surface of the adjacent tooth, a second mesial proximal portion forming a second mesial proximal surface corresponding with a second mesial proximal surface of the adjacent tooth, and a second distal proximal portion forming a second distal proximal surface corresponding with a second distal proximal surface of the adjacent tooth, and
wherein the mold body is configured to combine with the two adjacent teeth of the patient to form separate mold cavities encompassing missing tooth structure for each of the two adjacent teeth.

27. The custom tool of claim 18, wherein the incisal portion, the mesial proximal portion, and the distal proximal portion are manufactured by three-dimensional printing.

28. The custom tool of claim 18, wherein the incisal portion, the mesial proximal portion, and the distal proximal portion together form an one-piece inner surface corresponding to the tooth's outer surface prior to restoration.

29. The custom tool of claim 18, further comprising a dental restorative material located within the mold cavity.

30. The custom tool of claim 18, wherein a first interproximal portion and a second interproximal portion assist in separating a first adjacent tooth and a second adjacent tooth from the at least one tooth.

31. The custom tool of claim 18, wherein a first interproximal portion and a second interproximal portion isolate the at least one tooth from blood or saliva.

32. The custom tool of claim 18, wherein the incisal portion, the mesial proximal portion, and the distal proximal portion are manufactured by CAD/CAM milling processes.

33. The custom tool of claim 18, further including a facial portion and a lingual portion based on three-dimensional scan data of the mouth of the patient; and
the facial portion extending from the incisal portion between the mesial proximal portion and the distal proximal portion and the lingual portion extending from the incisal portion opposite the facial portion between the mesial proximal portion and the distal proximal portion; and
the incisal portion, the mesial proximal portion, the distal proximal portion, the facial portion and the lingual portion form the one-piece portion that fits over the at least one tooth of the patient.

34. The custom tool of claim 33 further including the facial portion and the lingual portion that is three-dimensionally printed based on the three-dimensional scan data of the mouth of the patient.

* * * * *

UNITED STATES PATENT AND TRADEMARK OFFICE
CERTIFICATE OF CORRECTION

PATENT NO. : 11,185,392 B2
APPLICATION NO. : 16/061362
DATED : November 30, 2021
INVENTOR(S) : James Hansen It is certified that error appears in the above-identified patent and that said Letters Patent is hereby corrected as shown below:

In the Claims

Column 17

Line 22, In Claim 3, delete "the lingual surface" and insert -- a lingual surface --, therefor.

Line 38, In Claim 7, before "first", insert -- the --.

Line 42, In Claim 8, delete "the lingual surface" and insert -- a lingual surface --, therefor.

Column 18

Line 34, In Claim 18, delete "the incisal surface" and insert -- an incisal surface --, therefor.

Line 56, In Claim 20, delete "the lingual surface" and insert -- a lingual surface --, therefor.

Column 19

Line 9, In Claim 25, delete "the lingual surface" and insert -- a lingual surface --, therefor.

Signed and Sealed this
Twenty-fifth Day of October, 2022

Katherine Kelly Vidal
*Director of the United States Patent and Trademark Office*